US011521039B2

(12) United States Patent
Park et al.

(10) Patent No.: US 11,521,039 B2
(45) Date of Patent: Dec. 6, 2022

(54) METHOD AND APPARATUS WITH NEURAL NETWORK PERFORMING CONVOLUTION

(71) Applicant: SAMSUNG ELECTRONICS CO., LTD., Suwon-si (KR)

(72) Inventors: Hyunsun Park, Seoul (KR); Wonjo Lee, Uiwang-si (KR); Sehwan Lee, Suwon-si (KR); Seungwon Lee, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 824 days.

(21) Appl. No.: 16/168,418

(22) Filed: Oct. 23, 2018

(65) Prior Publication Data

US 2019/0130250 A1 May 2, 2019

(30) Foreign Application Priority Data

Oct. 30, 2017 (KR) .................. 10-2017-0142570

(51) Int. Cl.
*G06N 3/04* (2006.01)
*G06N 3/08* (2006.01)
*G06F 17/15* (2006.01)
*G06N 5/04* (2006.01)
*G06F 16/901* (2019.01)

(52) U.S. Cl.
CPC ............. *G06N 3/04* (2013.01); *G06F 16/901* (2019.01); *G06F 17/15* (2013.01); *G06F 17/156* (2013.01); *G06N 3/0454* (2013.01); *G06N 3/082* (2013.01); *G06N 5/046* (2013.01); *G06N 3/0445* (2013.01); *G06N 3/0481* (2013.01)

(58) Field of Classification Search
CPC ...... G06F 16/901; G06F 17/15; G06F 17/156; G06N 3/04; G06N 3/0445; G06N 3/0454; G06N 3/0481; G06N 3/082; G06N 5/046
See application file for complete search history.

(56) References Cited

U.S. PATENT DOCUMENTS

| 5,636,326 A | 6/1997 | Stork et al. |
| 9,600,763 B1 | 3/2017 | Kasagi |
| 2016/0358068 A1* | 12/2016 | Brothers ................ G06N 3/082 |
| 2016/0358070 A1 | 12/2016 | Brothers et al. |

(Continued)

FOREIGN PATENT DOCUMENTS

| KR | 10-2016-0143505 A | 12/2016 |
| KR | 10-2016-0143548 A | 12/2016 |

OTHER PUBLICATIONS

Liu et al., "Pruning of Winograd and FFT Based Convolution Algorithm", Mar. 2016, CS231n: Convolutional Neural Networks for Visual Recognition, pp. 1-7 (Year: 2016).*

(Continued)

*Primary Examiner* — Brent Johnston Hoover
(74) *Attorney, Agent, or Firm* — NSIP Law

(57) ABSTRACT

A process-implemented neural network method includes obtaining a plurality of kernels and an input feature map; determining a pruning index indicating a weight location where pruning is to be performed commonly within the plurality of kernels; and performing a Winograd-based convolution operation by pruning a weight corresponding to the determined pruning index with respect to each of the plurality of kernels.

24 Claims, 9 Drawing Sheets

(56) References Cited

U.S. PATENT DOCUMENTS

2017/0011288 A1 1/2017 Brothers et al.
2017/0337471 A1* 11/2017 Kadav ............... G06K 9/627

OTHER PUBLICATIONS

Guo et al., "Dynamic Network Surgery for Efficient DNNs", Nov. 10, 2016, arXiv:1608.04493v2, pp. 1-9 (Year: 2016).*
Li et al., "Enabling Sparse Winograd Convolution by Native Pruning", Oct. 13, 2017, arXiv:1702.08597v2, pp. 1-8 (Year: 2017).*
Han, Song, et al. "Learning Both Weights And Connections For Efficient Neural Network." *Advances In Neural Information Processing Systems*. 2015. (9 pages, in English).
Lebedev, Vadim, et al. "Fast ConvNets Using Group-Wise Brain Damage." *Proceedings of the IEEE Conference on Computer Vision and Pattern Recognition*. 2016. (11 pages, in English).
Li, Sheng, et al. "Enabling Sparse Winograd Convolution By Native Pruning." arXiv preprint arXiv:1702.08597 (2017). (8 pages, in English).
Park, Hyunsun, et al. "Zero and Data Reuse-aware Fast Convolution for Deep Neural Networks on GPU." *Proceedings of the Eleventh IEEE/ACM/IFIP International Conference on Hardware/Software Codesign and System Synthesis* Oct. 1-7, 2016 (10 pages in English).
Anwar, Sajid, et al. "Structured Pruning of Deep Convolutional Neural Networks." *ACM Journal on Emerging Technologies in Computing Systems (JETC) vol. 13 Issue 3 Article 32*, Feb. 2017 (18 pages in English).
Korean Office Action dated Jan. 7, 2022 in counterpart Korean Patent Application No. 10-2017-0142570 (4 pages in English, 4 pages in Korean).

* cited by examiner

METHOD AND APPARATUS WITH NEURAL NETWORK PERFORMING CONVOLUTION

CROSS-REFERENCE TO RELATED APPLICATIONS

This application claims the benefit of Korean Patent Application No. 10-2017-0142570, filed on Oct. 30, 2017, in the Korean Intellectual Property Office, the disclosure of which is incorporated herein in its entirety by reference.

BACKGROUND

1. Field

The present disclosure relates to methods and apparatuses with a neural network performing a Winograd-based convolution operation.

2. Description of the Related Art

Technological automation of feature extraction, pattern recognition, and/or analyses, as only examples, has been implemented through processor implemented neural network models, as specialized computational architectures, that after substantial training may provide computationally intuitive feature extractions or recognitions, mappings between input patterns and output patterns, pattern recognitions of input patterns, or categorization in various forms. The trained capability of extracting such information or recognitions, generating such mappings, performing such pattern recognitions, or performing such categorizations may be referred to as a learning capability of the neural network. Such trained capabilities may also enable the specialized computational architecture to classify an input pattern or object(s), or portions of the input pattern or object(s), e.g., as a member that belongs to one or more predetermined groups. Further, because of the specialized training, such specially trained neural network may thereby have a generalization capability of generating a relatively accurate or reliable output with respect to an input pattern that the neural network may not have been trained for, for example. However, because such operations are performed through such specialized computation architectures, and in different automated manners than they would have been performed in non-computer implemented or non-automated approaches, they also invite problems or drawbacks that only occur because of the automated and specialized computational architecture manner that they are implement.

A neural network apparatus requires many operations for complex input data, which may require large power consumption and require long processing times.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of performing a convolution operation in a neural network, the method including: obtaining a plurality of kernels and an input feature map; determining a pruning index indicating a weight location where pruning is to be performed commonly within the plurality of kernels; and performing a Winograd-based convolution operation by pruning a weight corresponding to the determined pruning index with respect to each of the plurality of kernels.

The obtaining may include obtaining another of a plurality of kernels and another input feature map in a convolution layer; and obtaining the plurality of kernels and the input feature map by performing a Winograd Transform on the another plurality of kernels and the another input feature map.

The determining may include determining the pruning index from among indexes indicating respective locations of weights within a kernel.

The determining may include: computing a representative value of weights corresponding to a same index within the plurality of kernels, with respect to each of indexes within a kernel; and determining the pruning index from among the indexes, based on the representative value computed with respect to each of the indexes.

The representative value may be any one of a root-mean square of the weights, an average value of the weights, and a median value of weights.

The determining may include determining as the pruning index at least one index, from among the indexes, having a representative value less than a predetermined threshold.

The determining may include: obtaining a plurality of middle maps by performing an elementwise multiplication operation between each of the plurality of kernels and the input feature map; computing a representative value of elements corresponding to a same index within the plurality of middle maps, with respect to each of indexes within a middle map; and determining the pruning index from among the indexes, based on the representative value computed with respect to each of the indexes.

The determining may include grouping the plurality of kernels into a plurality of kernel groups and determining a pruning index for each of the plurality of kernels groups which is to be applied to each respective kernel group, and the performing may include performing the Winograd-based convolution operation by pruning each of the plurality of kernel groups according to the determined pruning index.

The method may further include adjusting another weight with respect to each of the plurality of kernels based on a result of the Winograd-based convolution operation, for generating a trained kernel.

The method may further include obtaining the trained kernel; and performing another convolution operation with another of an input feature map using the trained kernel in an inference operation, indicating a result of the inference operation.

A non-transitory computer-readable storage medium may store instructions that, when executed by a processor, cause the processor to perform the method of performing a convolution operation in a neural network.

In another general aspect, there is provided a neural network apparatus including: a memory on which instructions stored; and a processor configured to, in response to executing the instructions: obtain a plurality of kernels and an input feature map; determine a pruning index indicating a weight location where pruning is to be performed commonly within the plurality of kernels; and perform a Winograd-based convolution operation by pruning a weight corresponding to the determined pruning index with respect to each of the plurality of kernels.

The processor may be further configured to determine the pruning index from among indexes indicating respective locations of weights within a kernel.

The processor may be further configured to: compute a representative value of weights corresponding to a same index within the plurality of kernels, with respect to each of indexes within a kernel; and determine the pruning index from among the indexes, based on the representative value computed with respect to each of the indexes.

The representative value may be any one of a root-mean square of the weights, an average value of the weights, and a median value of weights.

The processor may be further configured to determine as the pruning index at least one index, from among the indexes, having a representative value less than a predetermined threshold.

The processor may be further configured to: obtain a plurality of middle maps by performing an elementwise multiplication operation between each of the plurality of kernels and the input feature map; compute a representative value of elements corresponding to a same index within the plurality of middle maps, with respect to each of indexes within a middle map; and determine the pruning index from among the indexes, based on the representative value computed with respect to each of the indexes.

The processor may be further configured to: group the plurality of kernels into a plurality of kernel groups; determine a pruning index for each of the plurality of kernels groups which is to be applied to each respective kernel group; and perform the Winograd-based convolution operation by pruning each of the plurality of kernel groups according to the determined pruning index.

The processor may be further configured to: obtain a plurality of kernels and an input feature map in a convolution layer; and obtain the plurality of kernels and the input feature map in the Winograd convolution layer by performing a Winograd Transform on the obtained plurality of kernels and the obtained input feature map in the convolution layer.

In another general aspect, there is provided a method of performing a convolution operation in a neural network, the method including: determining a pruning index; generating a plurality of pruned kernels by pruning, for each of a plurality of kernels, a weight corresponding to the pruning index; and generating a plurality of output feature maps by performing an operation with respect to an input feature map and each of the plurality of pruned kernels.

The method may further include determining representative weights, wherein each representative weight is based on weights of the plurality of kernels corresponding to a same index; and selecting a representative weight from the representative weights; and determining an index corresponding to the selected representative weight as the pruning index.

The method may further include obtaining a plurality of middle maps by performing an operation between each of the plurality of kernels and the input feature map; determining representative weights, wherein each representative weight is based on weights of the plurality of middle maps corresponding to a same index; and selecting a representative weight from the representative weights; and determining an index corresponding to the selected representative weight as the pruning index, wherein the generating of the plurality of output feature maps may include performing an operation with respect to each of the plurality of middle maps and a predetermined matrix.

In another general aspect, there is provided a method of performing a convolution operation in a neural network, the method including: grouping a plurality of kernels into a plurality of kernel groups; determining a pruning index for each of the plurality of kernels groups; pruning, for each of the plurality of kernel groups, kernel weights corresponding to the pruning index; and generating a plurality of output feature maps by performing a convolution operation with respect to an input feature map and each of the plurality of kernels.

Additional aspects will be set forth in part in the description which follows and, in part, will be apparent from the description, or may be learned by practice of the presented embodiments.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Figure 1:
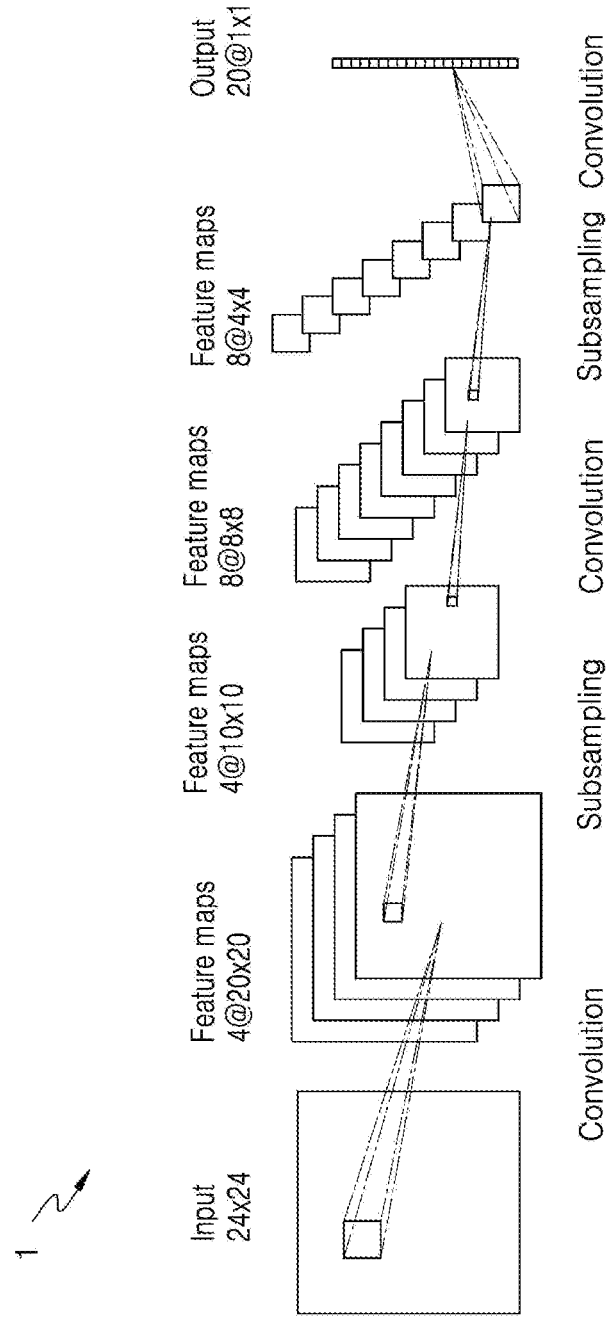
FIG. 1 is a diagram for describing an architecture of a neural network according to an embodiment.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terms used in the present embodiments are selected from among general terms that are currently widely used in consideration of their functions in the present embodiments. However, the terms may be different according to an intention of those with an understanding of the disclosure of this application, a precedent, or the advent of new technology. In addition, in particular cases, some terms are discretionally selected, and the meaning of those terms will be described in detail in the description of a corresponding embodiment. Therefore, the terms used in the present embodiments are to be defined based on not simple designations of the terms but the meaning of the terms and the context of the present embodiments.

In the description of embodiments, it will be understood that when a portion is referred to as being connected to another portion, it may be directly connected to the other portion or may be electrically connected to the other portion with an intervening element therebetween. It will be further understood that when a portion "includes" or "comprises" an element, unless otherwise defined, the portion may further include another element, not excluding the other element.

The term such as "include" or "comprise" used in the present embodiments should not be construed as necessarily including all of various elements or operations described herein, and some of the elements or operations may not be included or additional elements or operations may be further included.

The description of embodiments below should not be construed as limiting the appended claims, and what those with an understanding of the disclosure of this application would have been able to infer will be understood as being included in the appended claims. Embodiments only for illustration will now be described in detail with reference to the accompanying drawings. As used herein, the term "and/or" includes any and all combinations of one or more of the associated listed items. Expressions such as "at least one of," when preceding a list of elements, modify the entire list of elements and do not modify the individual elements of the list.

FIG. 1 is a diagram for describing an architecture of a neural network 1 according to an embodiment.

Referring to FIG. 1, the neural network 1 may be an architecture of a deep neural network (DNN) or n-layers neural networks. The DNN or the n-layers neural networks may correspond to convolutional neural networks (CNN), recurrent neural networks (RNN), deep belief networks, restricted Boltzman machines, etc. For example, the neural network 1 may be realized as, but is not limited to, the CNN. Although FIG. 1 shows a convolution layer of the CNN corresponding to an example of the neural network 1, the CNN may further include a pooling layer and a fully connected layer in addition to the convolution layer.

For example, in the present disclosure, apparatuses may be described as implementing CNNs, e.g., based on convolutions using previously trained parameters and/or convolutions or convolution operations that are selectively performed based on such previously trained parameters, though embodiments are not limited to such apparatuses only performing such convolutional and/or selective convolutional operations, but rather embodiments also include such apparatuses also being configured to train the CNN as described below, as well as or also use the trained CNN and/or selectively implemented CNN in an example, filtering, detection, recognition, rejection, verification, classification, or other such 'interpretative' operations or objectives the respective layers or overall CNN are trained to perform. Herein, it is also noted that use of the term 'may' with respect to an example or embodiment, e.g., as to what an example or embodiment may include or implement, means that at least one example or embodiment exists where such a feature is included or implemented while all examples and embodiments are not limited thereto.

Referring to FIG. 1, a neural network apparatus may train and/or acquire trained parameters corresponding to one or more layers included in a neural network, e.g., the herein discussed example CNN type of neural network, noting that embodiments are not limited thereto. For example, the neural network apparatus may acquire parameters, e.g., as determined by the neural network apparatus during the training of the neural network by the neural network apparatus, from memory, or through external request or provision. Additionally, the neural network apparatus may acquire the parameters from provided kernel, kernel element, and/or other connection weight vectors, matrix or matrices, or other format kernels, kernel elements, and/or other connection weights, representing some or all of the trained kernels and/or weighted connections of the trained neural network. The neural network apparatus may also be provided or made available the kernel, kernel element, and/or other connection weight vectors, matrix or matrices, or other format kernels, kernel elements, and/or connection weights, as a result of training of the neural network by the neural network apparatus or by another processing apparatus or server, for example. The neural network apparatus is representative of one or more processors and one or more non-transitory memories, for example, such as to store such parameters, for use during and after the convolutional and/or selective convolutional operations of the neural network, and for storing of instructions, which when executed by the one or more processors, cause the one or more processors to implement one or more or all operations described herein, for example.

The neural network includes a plurality of layers, and each of the layers includes a plurality of nodes. For example, there may be an input layer, at least one hidden layer, and an output layer. Depending on the architecture of the neural network, nodes included in neighboring layers may be selectively connected according to respective connections, e.g., which may or may not be weighted. For example, the neural network may be implemented by a processor, i.e., one or more processors, configured to generate a neural network structure/architecture with such a plurality of layers each including plural nodes and configured to apply such example weighted connections between neighboring nodes in neighboring layers of the neural network structure, and/or apply such example kernels or weighted connections within layers, to interpret input data applied to the neural network structure. As only examples, herein such an 'interpretation' of input data may include a performed filtering, detection, recognition, verification, or rejection, such as image recognition or verification, translation or rejection, or input data binary or multi-class classification, clustering, pattern observation, transformation, and/or regression, as well as any other trained objective of the neural network. Thus, as a non-limiting examples, in varying embodiments, the neural network may be trained for image or object detection, recognition, identification, rejection, or discrimination. Thus, based on the training data and desired interpretation objective, the architecture, selective connections between neighboring nodes and/or kernels, kernel elements, or other connections within layers may be varied during training by the neural network apparatus until the neural network is trained to a desired acceptability for the desired interpretation objective. For example, in examples where the neural network is trained for image or object filtering, detection, recognition, verification, or rejection, the neural network may include convolutional layers or be representative of a CNN, and thus the respective convolutional kernel elements, e.g., for varying feature extractions through feature kernels, may be trained to an original desired acceptability for the image or object filtering, detection, recognition, verification, or rejection operations. The neural network may also be of a different type of neural network and merely include one or more convolutional layers, e.g., for selective feature extraction, for other objectives. Thus, herein, though embodiments may be discussed from the perspective of a neural network apparatus, such reference to CNNs is not intended to be limiting of the apparatus to only implementing CNNs or even to implement CNNs. Returning to the training of the neural network, the resultant kernels, kernel elements, and/or other connection weights of the trained neuro network may be referred to as parameters of the neural network, e.g., demonstrated as at least trained kernel elements of a convolutional layer or operation of the CNN. For example, the neural network may be trained based on the labeled input image information or desired corresponding output images, filtering, classifications, or geometric parameters, such as through a backpropagation algorithms. In the training, example connection weightings between nodes of different hidden layers may be recursively adjusted until the corresponding neural network model is trained with a desired accuracy rate or below a maximum error rate, for example. Likewise, during the training, example kernels, kernel elements, or connection weightings between nodes within respective layers may be adjusted in the recursive adjusting. The respectively trained neuro network may be stored in a memory of the training and/or recognition apparatus, for example. In examples, the trained neural network may be stored in trained vectors, matrix or matrices, or other formats, e.g., where elements of the vectors, matrices, or other formats represent or suggest the corresponding trained parameters, e.g., trained kernels, kernel elements, and/or other weighted connections, of the corresponding neural network structure. The stored trained neural network may further include hyper-parameter information, which may define the specific structure or architecture of the corresponding neural network for which the example stored trained parameters correspond to. The hyper-parameters may define the architecture or structure of the inputs and output layers as well as how many hidden layers there are and the function and structure/architecture of the respective hidden layers, such the respective arrangement and which are fully connected, recurrent, convolutional, de-convolutional, or pooling layers, as only examples. The hyper-parameters may further include information of the configuration and values of any bias and/or contextual nodes in the neural network, corresponding activation functions of the nodes, types of nodes, such as long short-term memory nodes, gated linear unit nodes, or merely nodes configured to perform a single activation function for a summation of inputs, and define any or any further recurrent structures of the neural network, which may vary depending on embodiment and interpretation objective of the trained neural network.

Thus, as illustrated, neural network 1 may be realized as an architecture having a plurality of layers including an input image layer, feature map generating layers, and output layer. In the neural network 1, a convolution operation is performed between the input image and a filter called a kernel, and as a result, the feature maps (or activation maps or convolved features) are output. The convolution operation with the kernel is performed again between the generated output feature maps as input feature maps and other kernels, and new feature maps are output. As a result of repeatedly performing the convolution operation, a recognition result regarding features of the input image through the neural network 1 may be output in the end.

For example, when an image having a 24×24 pixel size is input to the neural network 1 of FIG. 1, the input image may be output as four-channel feature maps having a 20×20 size through the convolution operation with the kernel. Thereafter, as a size of the 20×20 feature maps decreases through repetition of the convolution operation with the kernel, features having a 1×1 size may be output in the end. The neural network 1 may output strong features capable of representing the entire image from the input image through filtering by repeatedly performing the convolution operation and a subsampling (or pooling or down-sampling) operation over several layers, and may draw a recognition result of the input image through the output final features.

Figure 2:
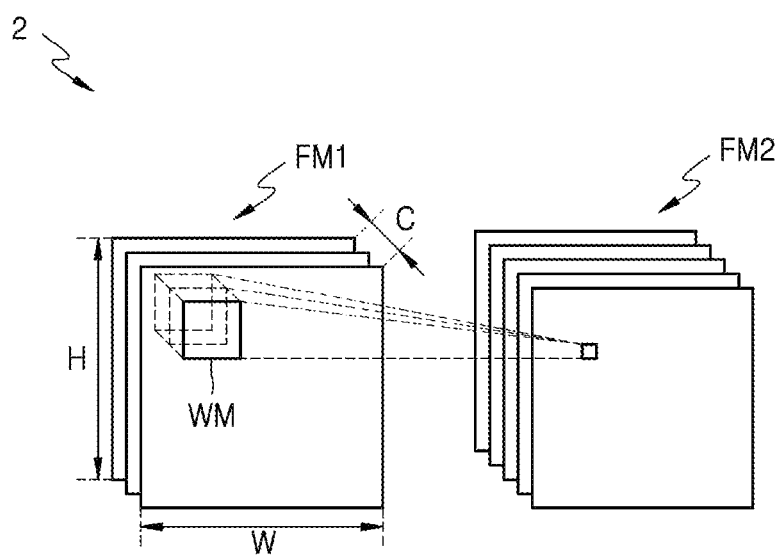
FIG. 2 is a diagram for describing a relationship between an input feature map and an output feature map in a neural network according to an embodiment.

FIG. 2 is a diagram for describing a relationship between an input feature map and an output feature map in a neural network according to an embodiment.

Referring to FIG. 2, with respect to a layer 2 of the neural network, a first feature map FM1 may correspond to the input feature map, and a second feature map FM2 may correspond to the output feature map. A feature map may refer to a data set representing various features of input data. The first and second feature maps FM1 and FM2 may have elements of a two-dimensional (2D) matrix or may have elements of a three-dimensional matrix, and a pixel value may be defined with respect to each element. The first and second feature maps FM1 and FM2 have a width W (or a column), a height H (or a row), and a depth C. The depth C may correspond to the number of channels.

The layer 2 may thus perform a convolution operation between the first feature map FM1 and a weight map WM of a kernel, and as a result, the second feature map FM2 may be generated. The weight map WM filters features of the first feature map FM1 by performing the convolution operation with the first feature map FM1, using weight defined with respect to each element. The weight map WM performs the convolution operation with windows (or tiles) of the first feature map FM1 while shifting the first feature map FM1 in a sliding window manner. During each shift, each weight included in the weight map WM may be multiplied and added with pixel values of an overlapping window in the first feature map FM1. A stride may correspond to the number of pixels by which the kernel slides between shifts. As the first feature map FM1 and the weight map WM are convoluted, one channel of the second feature map FM2 may be generated. Although FIG. 2 illustrates the weight map WM for one kernel, in practice, weight maps of a plurality of kernels may each be convoluted with the first feature map FM1 to generate the second feature map FM2 having a plurality of channels.

The second feature map FM2 may also thus correspond to an input feature map of the next layer of the neural network 1. For example, the second feature map FM2 may be an input feature map of a pooling (or subsampling) layer.

FIGS. 1 and 2 illustrate only the schematic architecture of the neural network 1 for convenience of description. However, examples of the neural network 1 include more or fewer layers, feature maps, kernels, etc. than illustrated, and it will be understood after an understanding of the disclosure of this application that examples include those where the sizes thereof are variously presented.

Figure 3:
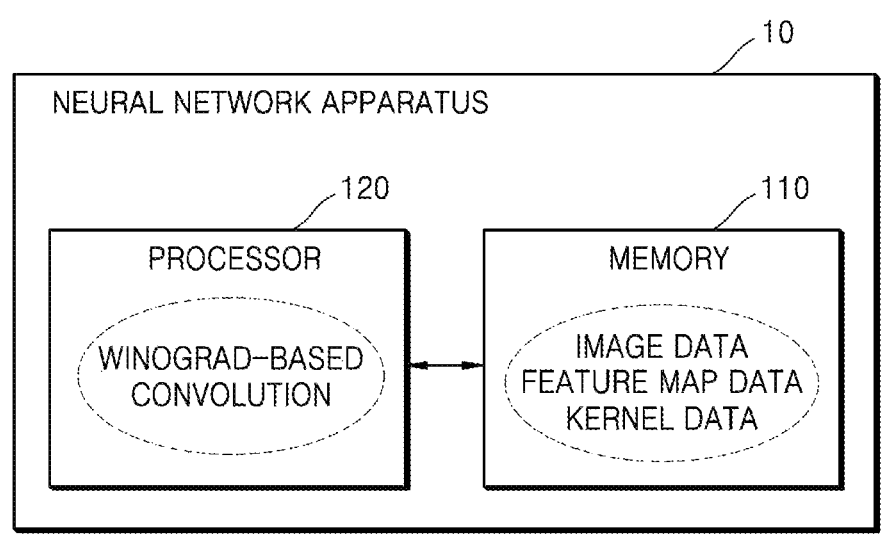
FIG. 3 is a block diagram illustrating a hardware configuration of a neural network apparatus according to an embodiment.

FIG. 3 is a block diagram illustrating hardware configuration of a neural network apparatus 10 according to an embodiment.

The neural network apparatus 10 may be realized as various types of devices such as a personal computer (PC), a server device, a mobile device, or an embedded device, and for example, may correspond to, but is not limited to, a smartphone performing voice recognition, image recognition, image classification, etc. using a neural network, a table device, an augmented reality (AR) device, an Internet of Things (IoT) device, an autonomous driving car, robotics, a medical device, etc. Further, the neural network apparatus 10 may correspond to a dedicated hardware (HW) accelerator mounted on the above devices, and may be, but is not limited to, an HW accelerator such as a neural processing unit (NPU) which is a dedicated module for driving the neural network, a tensor processing unit (TPU), or a neural engine.

Referring to FIG. 3, the neural network apparatus 10 includes a processor 120 and a memory 110. FIG. 3 illustrates elements of the neural network apparatus 10 related to the present embodiment. Accordingly, examples of the neural network apparatus 10 include other elements in addition to the elements shown in FIG. 3.

The processor 120 controls overall functions for executing the neural network apparatus 10. In an example, the processor 120 may control the neural network apparatus 10 by executing program instructions stored in the memory 110 inside the neural network apparatus 10, noting that examples are not limited thereto. The processor 120 may be realized as, but is not limited to, a central processing unit (CPU), a graphics processing unit (GPU), an application processor (AP), etc. provided in the neural network apparatus 10.

The memory 110, which is hardware storing various items of data which are processed in the neural network apparatus 10, may store, for example, items of data processed, to be processed in the neural network apparatus 10, and results of the same. In addition, the memory 110 may store applications, drivers, etc. to be driven by the neural network apparatus 10. The memory 110 may include random access memory (RAM) such as dynamic random access memory (DRAM) or static random access memory (SRAM), read-only memory (ROM), electrically erasable programmable read-only memory (EEPROM), compact disc read-only memory (CD-ROM), Blu-ray or other optical disc storage, a hard disk drive (HDD), a solid state drive (SSD), or flash memory.

The processor 120 reads/writes neural network data, for example, image data, feature map data, kernel data, etc. from/to the memory 110 and executes the neural network by using the read/written data. When the neural network is executed, the processor 120 repeatedly performs a convolution operation between an input feature map and a kernel to generate data regarding an output feature map. In this regard, an operation count of the convolution operation may be determined depending on various factors such as the number of channels of the input feature map, the number of channels of the kernel, a size of the input feature map, a size of the kernel, and a precision of a value. Further to the neural network 1 illustrated in FIG. 1, examples include the neural network driven by the neural network apparatus 10 realized as more complex architectures. Accordingly, the processor 120 performs a significantly large count of convolution operations, reaching hundreds of millions to tens of billions, or more, and a frequency at which the processor 120 accesses the memory 110 for the convolution operation may also increase dramatically. Thus, with typical convolution operating neural networks, such numerous processing and temporary or long term memory access for the convolution operation creates substantial impediments to implementing the same in most processing devices and environments, but for the most powerful, power intensive, and time consuming processing devices and environments, resulting in drawbacks in the technological environment. In contrast, examples of the neural network apparatus of the present application decrease operation count and increase operation speed, allowing for the convolution operation to be more efficiently implemented.

The processor 120 may perform a Winograd-based-convolution operation. The Winograd-based convolution is an efficient convolution algorithm and enables the number of multiplication operations required to execute convolution operations to decrease significantly over typical convolutional approaches. In detail, the processor 120 may perform the Winograd-based-convolution operation by performing Winograd Transform on an input feature map and a plurality of kernels in a convolution layer.

For example, when an input feature map in the convolution layer is a 1×4 matrix [$d_0$ $d_1$ $d_2$ $d_3$], the processor 120 may obtain [$d_0-d_2$ $d_1+d_2$ $d_2-d_1$ $d_1-d_3$], which is an input feature map in a Winograd convolution layer, by performing Winograd Transform on [$d_0$ $d_1$ $d_2$ $d_3$]. In addition, when a kernel in the convolution layer is a 1×3 matrix [$g_0$ $g_1$ $g_2$], the processor 120 may obtain $$\left[ g_0 \quad \frac{g_0 + g_1 + g_2}{2} \quad \frac{g_0 - g_1 + g_2}{2} \quad g_2 \right],$$

which is a kernel in the Winograd convolution layer, by performing Winograd Transform on [$g_0$ $g_1$ $g_2$]. Next, the processor 120 may obtain an output feature map [$y_0$ $y_1$] by performing the Winograd-based-convolution operation according to Equation 1 below.

$$\begin{bmatrix} y_0 \\ y_1 \end{bmatrix} = \quad \text{[Equation 1]}$$

$$\begin{bmatrix} 1 & 1 & 1 & 0 \\ 0 & 1 & -1 & -1 \end{bmatrix} [d_0 - d_2 \quad d_1 + d_2 \quad d_2 - d_1 \quad d_1 - d_3]$$

$$\begin{bmatrix} g_0 \\ \frac{g_0 + g_1 + g_2}{2} \\ \frac{g_0 - g_1 + g_2}{2} \\ g_2 \end{bmatrix}$$

The processor 120 may obtain a plurality of kernels and an input feature map in the Winograd convolution layer, e.g., in the Winograd domain. According to an embodiment, the processor 120 may obtain an input feature map and a plurality of kernels in a convolution layer from the memory 110 or a local memory, and may obtain a plurality of kernels and an input feature map in a Winograd convolution layer by performing Winograd Transform on the obtained input feature map and the obtained plurality of kernels in the convolution layer. According to some embodiments, a plurality of kernels and a input feature map in the Winograd convolution layer may be previously generated, e.g., prior to a current training operation, and stored in the memory 110 or the local memory, and the processor 120 may directly obtain the plurality of kernels and the input feature map in a Winograd convolution layer from the memory 110 or the local memory.

The processor 120 may determine a pruning index indicating weight where pruning is to be performed commonly within the plurality of kernels in the Winograd convolution layer. Pruning may refer to a process of setting 0 (zero) as values of one or more weights within a kernel. In addition, in a broad sense, pruning may refer to a process of performing a convolution operation by setting 0 as weight within a kernel, and compensating for lost accuracy, e.g., due to the pruning, through additional training. An index may refer to a spatial location of an element within a map or a kernel. For example, when a kernel is a 2D matrix with weight as an element of the matrix, the index may refer to a corresponding weight at [row, column] of the matrix. The pruning index may refer to a spatial location of weight where pruning is to be performed commonly within a plurality of kernels. For example, when each of the plurality of kernels to be applied in the convolution layer is an m×n matrix (where m and n are natural numbers), and the pruning index is [row, column]= [x, y] (where x is an integer less than or equal to m, and y is an integer less than or equal to n), the processor 120 may prune weights corresponding to [x, y] in each of the plurality of kernels, e.g., in multiple or each channel of the kernel.

The processor 120 may determine a pruning index from among indexes indicating respective locations of weights within a kernel. In other words, the processor 120 may determine at least one of the indexes as the pruning index for performing pruning on each of a plurality of kernels in a lump.

According to an embodiment, the processor 120 may compute a representative value of weights corresponding to the same index within a plurality of kernels with respect to each index within a kernel. The representative value of weights may be, but is not limited to, at least one of an average value, a root-means square, and a median value of weights.

Next, the processor 120 may determine a pruning index from among indexes, based on the representative value computed with respect to each index. According to an embodiment, the processor 120 may determine an index, from among indexes, having a representative value less than a predetermined threshold as a pruning index. According to some embodiments, the processor 120 may determine the number of pruning indexes, based on a number less than a predetermined percentage of the number of all indexes. According to some embodiments, since there may be an error rate of a result of Winograd convolution according to pruning, the processor 120 may determine the number of pruning indexes for satisfying the error rate less than a predetermined value.

According to some embodiments, the processor 120 may obtain a plurality of middle maps by performing an element-wise multiplication operation between each of a plurality of kernels and an input feature map in a Winograd convolution layer. As a result of the processor 120 performing the elementwise multiplication operation, for example, the processor 120 may obtain the plurality of middle maps respectively corresponding to the plurality of kernels.

Next, the processor 120 may compute a representative value of elements corresponding to the same index of the plurality of middle maps with respect to each index within a middle map. The representative value of elements may be, but is not limited to, at least one of an average value, a root-means square, and a median value of elements. Next, the processor 120 may determine a pruning index from among indexes, based on the representative value computed with respect to each index.

The processor 120 may perform a Winograd-based-convolution operation by pruning weight corresponding to a predetermined pruning index with respect to each of the plurality of kernels.

In addition, the processor 120 may group a plurality of kernels in a Winograd convolution layer into a plurality of kernel groups. According to an embodiment, the processor 120 may group a plurality of kernels into a plurality of kernel groups, based on a predetermined number. The predetermined number may be the number of kernels the processor is determined to be capable of processing in parallel. In addition, since the processor 120 may include a plurality of processors, the number of kernels for each group may be determined according to the number of the plurality of processors. Next, the processor 120 may determine a pruning index which is to be applied to each of the plurality of kernel groups, and may perform a Winograd convolution operation by pruning each of the plurality of kernel groups according to a predetermined pruning index.

Figure 4:
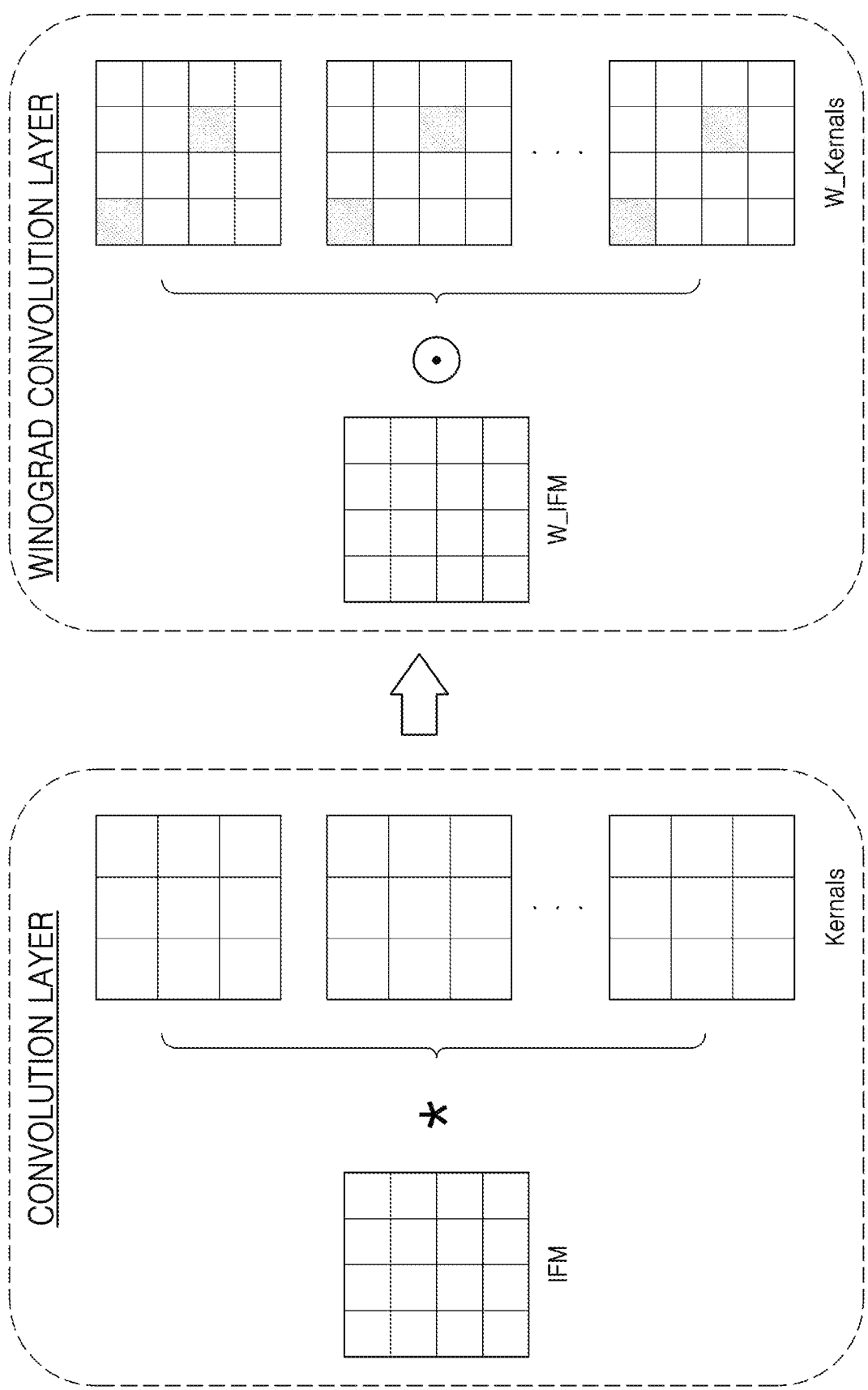
FIG. 4 shows an embodiment in which a processor performs a Winograd-based convolution operation.

FIG. 4 shows an embodiment in which the processor 120 performs a Winograd-based-convolution operation.

The processor 120 may obtain an input feature map (IFM) and a plurality of kernels (Kernels) for/in a convolution layer. The processor 120 may then obtain a corresponding input feature map (W_IFM) and a plurality of kernels (W_Kernels) in a Winograd convolution layer. According to an embodiment, the processor 120 may obtain the plurality of W_Kernels and the input feature map W_IFM in the Winograd convolution layer by performing Winograd Transform on the obtained input feature map IFM and the obtained plurality of Kernels in the convolution layer. During the Winograd Transform, weights of a kernel in the convolution layer may be transformed into weights of a kernel in the Winograd convolution layer.

For example, when the input feature map IFM is a 4×4 matrix, and each of the plurality of Kernels is a 3×3 matrix, the processor 120 may obtain the input feature map W_IFM and the plurality of W_Kernels in the Winograd convolution layer by using Equation 2 below.

$$C = \begin{bmatrix} 1 & 0 & -1 & 0 \\ 0 & 1 & 1 & 0 \\ 0 & -1 & 1 & 0 \\ 0 & 1 & 0 & -1 \end{bmatrix} \quad W\_IFM = C^T \times IFM \times C \qquad \text{[Equation 2]}$$

$$G = \begin{bmatrix} 1 & 0 & 0 \\ \frac{1}{2} & \frac{1}{2} & \frac{1}{2} \\ \frac{1}{2} & -\frac{1}{2} & \frac{1}{2} \\ 0 & 0 & 1 \end{bmatrix} \quad W\_Kernal = G \times Kernal \times G^T$$

The processor 120 may determine a pruning index indicating weight where pruning is to be performed commonly within the plurality of W_Kernels in the Winograd convolution layer. In other words, the processor 120 may determine the pruning index as a common spatial location on the plurality of W_Kernels where pruning is to be performed. For example, as shown in FIG. 4, when each of the plurality of W_Kernels is a 4×4 matrix including weights, the processor 120 may determine [1, 1] and [3, 3], which are [row, column] of the matrix, as a common pruning index on the plurality of W_Kernels.

According to an embodiment, the processor 120 may compute a representative value of weights corresponding to the same index of the plurality of W_Kernels. Next, the processor 120 may determine a pruning index, based on the representative value computed with respect to each index. A concrete embodiment will be described below with reference to FIG. 6.

According to some embodiments, the processor 120 may obtain a plurality of middle maps by performing an elementwise multiplication operation between each of the plurality of W_Kernels and the input feature map W_IFM. Next, the processor 120 may compute a representative value of elements corresponding to the same index of the plurality of middle maps with respect to each index within a middle map. Next, the processor 120 may determine a pruning index from among indexes, based on the representative value computed with respect to each index. Such an embodiment will be described below in greater detail with reference to FIG. 7.

The processor 120 may perform Winograd-based convolution by pruning weight corresponding to a predetermined pruning index with respect to each of the plurality of W_Kernels.

Accordingly, since the neural network apparatus 10 performs pruning according to a pruning index common with respect to a plurality of kernels, a count of a Winograd-based-convolution operation may decrease and an operation speed may increase compared to the related art. For example, when each of the plurality of kernels is a 4×4 matrix, it may take 16 cycles to process an elementwise operation between each of the plurality of kernels and an input feature map in parallel. However, the neural network apparatus 10 may omit an operation regarding weight corresponding to a pruning index in the plurality of kernels, and thus, it may take less than 16 cycles to process the elementwise operation between each of the plurality of kernels and the input feature map in parallel. For example, in FIG. 4, the neural network apparatus 10 prunes weight corresponding to the pruning index [1, 1] and [3, 3] commonly in each of the plurality of W_Kernels, and accordingly, it may take 14 cycles to process an elementwise operation between each of the plurality of W_Kernels and the input feature map W_IFM in parallel.

By pruning according to a pruning index common with respect to a plurality of kernels, the neural network apparatus as disclosed herein increases processing efficiency, increases processing speed, and thus reduces operation costs and increases the efficiency of the computing devices and/or processors which may be included in the apparatus. Therefore, the present disclosure, using the neural network disclosed herein, improves upon existing computing devices and/or computer functionalities wherein, e.g., a pruning index is not common with respect to a plurality of kernels. Such existing computer functionalities include image detection, recognition, and/or classification, such as machine vision.

Figure 5:
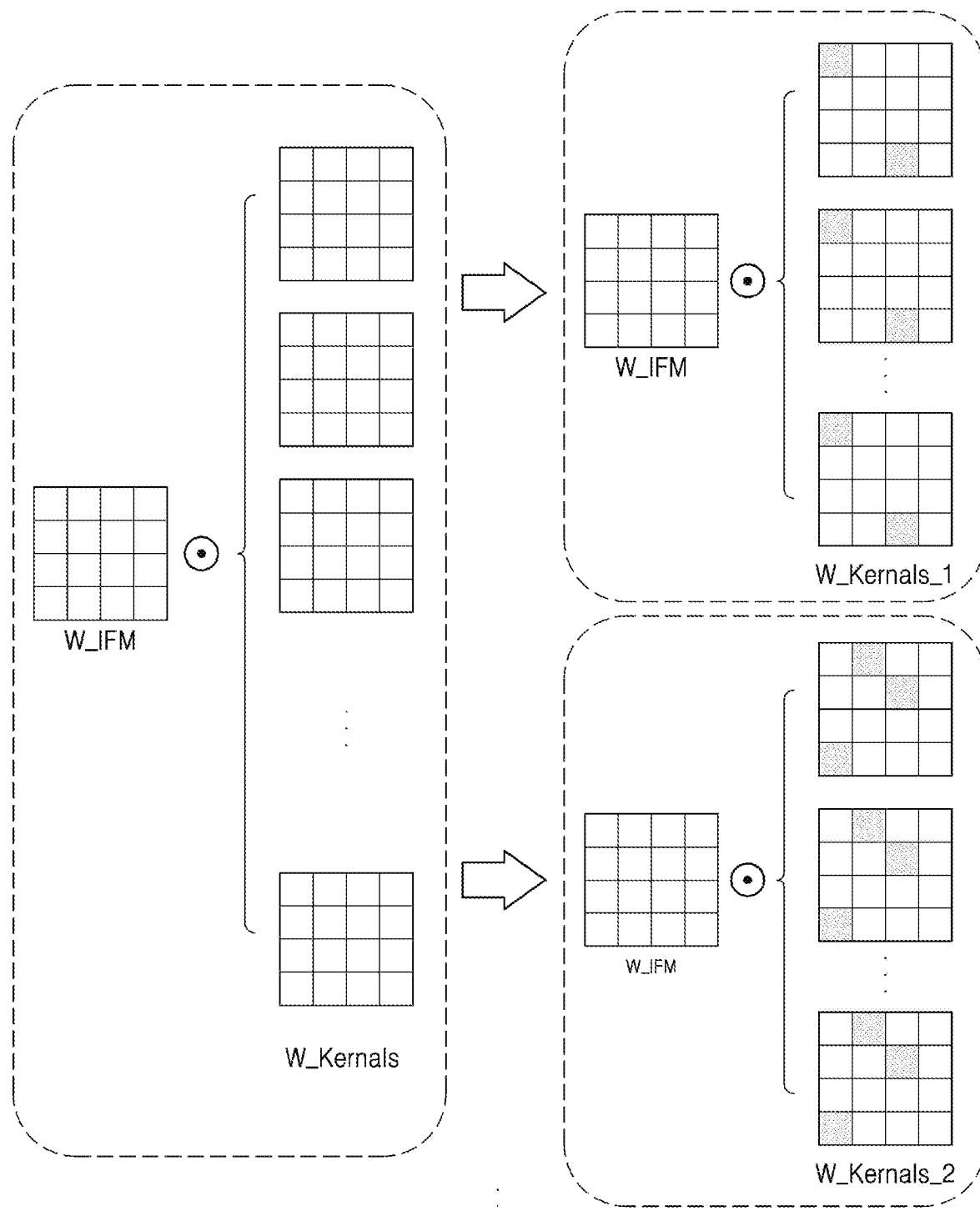
FIG. 5 shows an embodiment in which a processor determines a pruning index by grouping a plurality of kernels.

FIG. 5 shows an embodiment in which the processor 120 determines a pruning index by grouping a plurality of kernels.

The processor 120 may group the plurality of W_Kernels in a Winograd convolution layer into a plurality of kernel groups W_Kernels 1, W_Kernels 2, . . . . . According to an embodiment, the processor 120 may group the plurality of W_Kernels into the plurality of kernel groups W_Kernels 1, W_Kernels 2, . . . , based on a predetermined number. For example, when the number of the plurality of W_Kernels is 28, the processor 120 may group the plurality of W_Kernels into a first kernel group and a second kernel group each including 10 kernels and a third kernel group including 8 kernels, based on 10 which is the predetermined number. That is, based on the number of W_Kernels (e.g, the 28 W_Kernels), the plurality of W_Kernels are grouped into a maximum amount of kernel groups including the predetermined number (e.g., the first and second kernel groups each including 10 kernels), and any remaining W_Kernels are grouped into a remaining kernel group (e.g., the third kernel group including 8 kernels). The predetermined number may be the number of kernels to be determined to be processed in parallel by all or a select number of processors.

The processor 120 may determine a pruning index which is to be applied to each of the plurality of kernel groups W_Kernels 1, W_Kernels 2, . . . . In detail, the processor 120 may determine a first pruning index indicating weight where pruning is to be performed commonly in kernels within the first kernel group W_Kernels 1, may determine a second pruning index indicating weight where pruning is to be performed commonly in kernels within the second kernel group W_Kernels 2, and may also determine a pruning index with respect to other kernel groups. For example, as shown in FIG. 5, the processor 120 may determine [1, 1] and [4, 3] as a first pruning index which is to be applied to the first kernel group W_Kernels 1, and may determine [1, 2], [2, 3], and [4, 1] as a second pruning index which is to be applied to the second kernel group W_Kernels 2.

The processor 120 may perform a Winograd convolution operation by pruning each of the plurality of kernel groups W_Kernels 1, W_Kernels 2, . . . according to a predetermined pruning index. In detail, the processor 120 may perform a Winograd convolution operation by pruning the first kernel group W_Kernels 1 according to the first pruning index [1, 1] and [4, 3], and may perform a Winograd convolution operation by pruning the second kernel group W_Kernels 2 according to the second pruning index [1, 2], [2, 3], and [4, 1].

Figure 6:
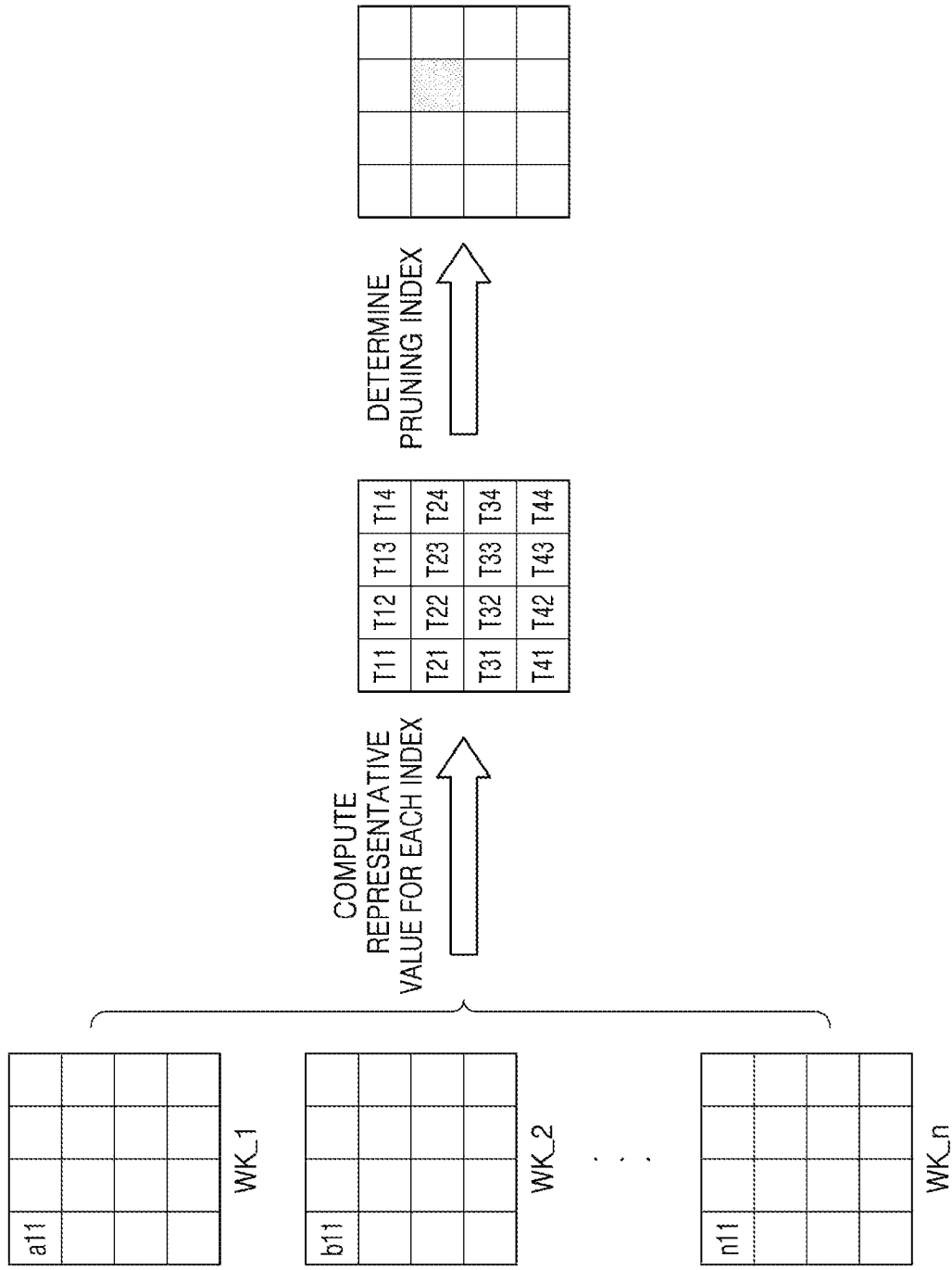
FIG. 6 shows an embodiment in which a processor determines a pruning index by using a weight value, according to an embodiment.

FIG. 6 shows an embodiment in which the processor 120 determines a pruning index by using a value of weight, according to an embodiment.

The processor 120 may obtain a plurality of kernels WK_1, WK_2, . . . , WK_n in a Winograd convolution layer.

The processor 120 may compute a representative value of weights corresponding to the same index of the plurality of kernels WK_1, WK_2, . . . , WK_n with respect to each index within a kernel. For example, as shown in FIG. 6, the processor 120 may compute a representative value T11 of weights a11, b11, . . . , n11 corresponding to an index [1, 1] of the plurality of kernels WK_1, WK_2, . . . , WK_n. In the same way, as shown in FIG. 6, the processor 120 may also compute representative values T12, T13, . . . T44 with respect to other 15 indexes within the kernel, respectively.

The processor 120 may determine a pruning index from among 16 indexes, based on the representative values T11, T12, . . . , T44 respectively computed with the indexes. According to an embodiment, the processor 120 may determine an index [2, 3], from among the indexes, having a representative value T23 less than a predetermined threshold as the pruning index. According to some embodiments, the processor 120 may determine the number of pruning indexes, based on a number less than a predetermined percentage of the number of all indexes. For example, the processor 120 may determine the index [2, 3] having the smallest representative value T23 as the pruning index, according to a number (1) less than 10 percent of the number (16) of all indexes.

Figure 7:
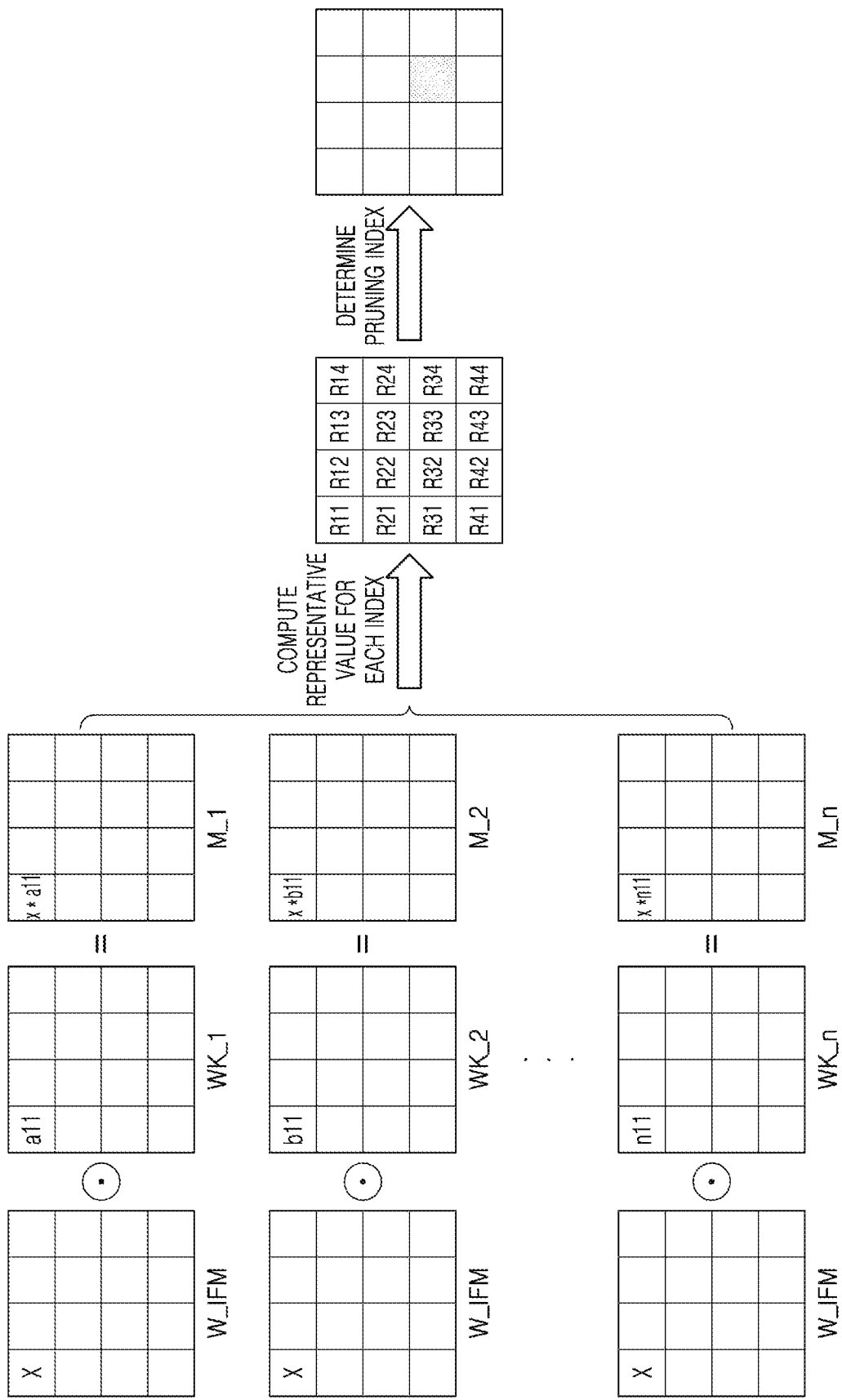
FIG. 7 shows an embodiment in which a processor determines a pruning index by using a middle operation value, according to another embodiment.

FIG. 7 shows an embodiment in which the processor 120 determines a pruning index by using a middle operation value, according to another embodiment.

The processor 120 may obtain the plurality of kernels WK_1, WK_2, . . . , WK_n in a Winograd convolution layer.

The processor 120 may obtain a plurality of middle maps M_1, M_2, . . . , M_n by performing an elementwise multiplication operation between each of the plurality of kernels WK_1, WK_2, . . . , WK_n and the input feature map W_IFM. For example, as shown in FIG. 7, the processor 120 may obtain the middle map M_1 by performing a multiplication operation between corresponding elements of the kernel WK_1 and the input feature map W_IFM. In detail, an element 'fall' of an index [1, 1] of the middle map M_1 may be computed through an multiplication operation between 'x' of an index [1, 1] of the input feature map W_IFM and 'a11' of an index [1, 1] of the kernel WK 1.

The processor 120 may compute a representative value of elements corresponding to the same index of the plurality of middle maps M_1, M_2, . . . , M_n with respect to each index within a middle map. For example, as shown in FIG. 7, the processor 120 may compute a representative value R11 of elements x*a11, x*b11, . . . , x*n11 corresponding to an index [1, 1] in the plurality of middle maps M_1, M_2, . . . , M_n, respectively. In the same way, as shown in FIG. 7, the processor 120 may also compute representative values R12, R13, . . . R44 with respect to other 15 indexes within a kernel, respectively.

The processor 120 may determine a pruning index from among indexes, based on the representative values R12, R13, . . . R44 respectively computed with the indexes. According to an embodiment, the processor 120 may determine an index [3, 3], from among the indexes, having a representative value R33 less than a predetermined threshold as the pruning index. According to some embodiments, the processor 120 may determine the index [3, 3] having the smallest representative value R33 as the pruning index, according to a number (1) less than 10 percent of the number (16) of all indexes.

The processor 120 may perform Winograd-based convolution by pruning weight corresponding to the pruning index with respect to each of the plurality of W_Kernels.

Figure 8:
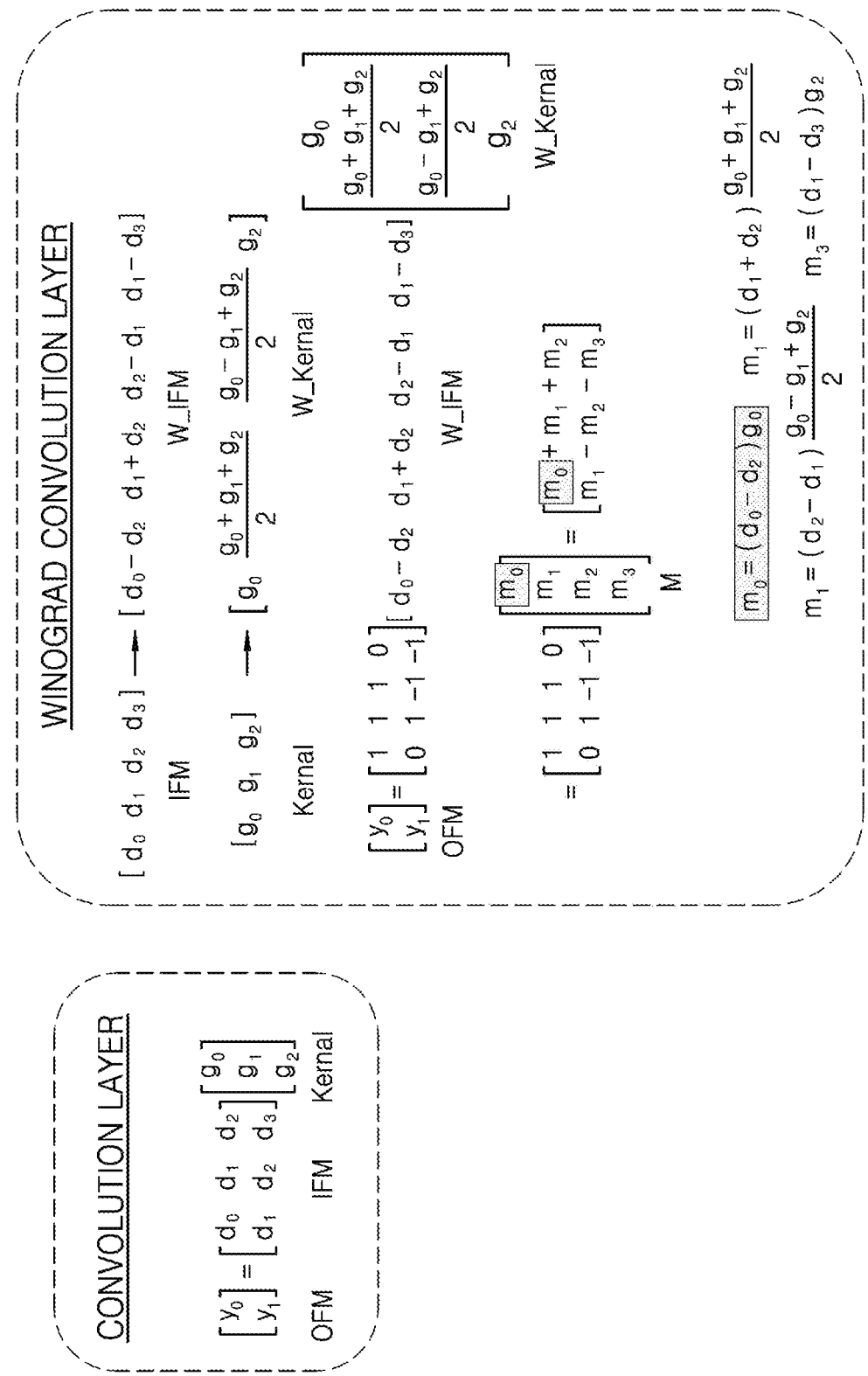
FIG. 8 shows a concrete embodiment in which a processor performs Winograd-based convolution.

FIG. 8 shows an embodiment in which the processor 120 performs Winograd-based convolution.

The processor 120 may perform convolution between an input feature map (IFM) and a kernel (Kernel) in a convolution layer to obtain an output feature map (OFM), and may also perform Winograd-based convolution between the input feature map IFM and the Kernel in a Winograd convolution layer. Regarding FIG. 8, for convenience of description, the input feature map IFM is described as a 1×4 matrix [$d_0$ $d_1$ $d_2$ $d_3$], the Kernel is described as a 1×3 matrix [$g_0$ $g_1$ $g_2$], and the output feature map OFM is described as a 1×2 matrix [$y_0$ $y_1$]. However, the present embodiment is not limited thereto.

To perform Winograd-based convolution, the processor 120 may obtain an input feature map (W_IFM) transformed by performing Winograd Transform on the input feature map (IFM). In addition, the processor 120 may obtain a kernel (W_Kernel) transformed by performing Winograd Transform on the kernel (Kernel). Next, the processor 120 may obtain a middle map (M) by performing an elementwise operation between the transformed input feature map W_IFM and the transformed kernel W_Kernel. Next, the processor 120 may obtain the output feature map (OFM) through an operation between the middle map M and a predetermined matrix.

The processor 120 may determine a pruning index by using the method described above, and may decrease counts of some operations of Winograd-based convolution through the determined pruning index. For example, as the processor 120 determines an index [1, 1] as the pruning index, the processor 120 may set 0 as weight corresponding to the index [1, 1], and in the same way, may also set 0 as an element '$m_0$' corresponding to an index [1, 1] of the middle map M. Since 0 is set as the element '$m_0$' corresponding to the index [1, 1] of the middle map M, and since to '$m_0$' is equal to '$(d_0-d_2) \times g_0$', the processor 120 may omit both the subtraction operation from '$(d_0-d_2) \times g_0$', wherein '$d_0-d_2$' is a part of an operation in which Winograd Transform is performed on the input feature map IFM to obtain the input feature map W_IFM, as well as the multiplication operation from '$(d_0-d_2) \times g_0$', wherein '$(d_0-d_2) \times g_0$' is a part of the elementwise operation between the input feature map W_IFM and the kernel W_Kernel used to obtain the middle map M. In addition, the processor 120 may omit an addition operation from '$m_0+m_1$ . . . ' of the operation between the middle map M and a predetermined matrix. Accordingly, when the index [1, 1] is determined as the pruning index, the element '$m_0$' of the middle map M is 0, and accordingly, the processor 120 may decrease each of a subtraction operation, a multiplication operation, and an addition operation by one count.

Accordingly, when the neural network apparatus 10 performs a Winograd-based-convolution operation, the neural network apparatus 10 may omit some operations related to the pruning index, thereby increasing a speed of the operation.

Figure 9:
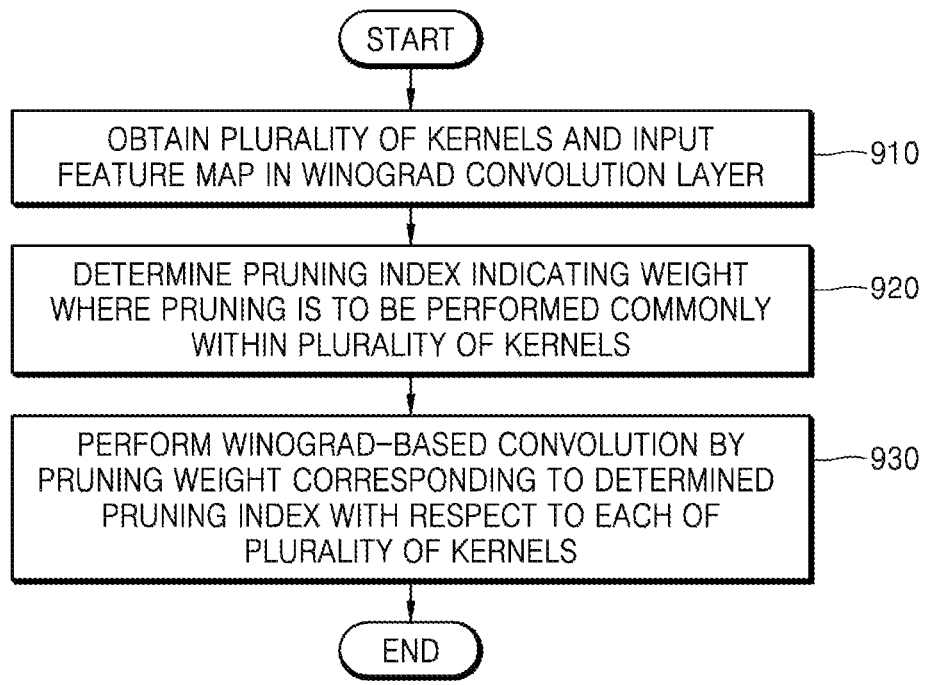
FIG. 9 is a diagram for describing an operation method of a neural network apparatus, according to an embodiment.

FIG. 9 is a diagram for describing an operation method of the neural network apparatus 10, according to an embodiment.

The method of FIG. 9 may be performed by each element of the neural network apparatus 10 of FIG. 3, and a repeated description thereof is omitted.

In operation 910, the neural network apparatus 10 may obtain a plurality of kernels and an input feature map in a Winograd convolution layer. According to an embodiment, the neural network apparatus 10 may obtain an input feature map and a plurality of kernels in a convolution layer, and may obtain the plurality of kernels and the input feature map in the Winograd convolution layer by performing Winograd Transform on the obtained input feature map and the obtained plurality of kernels in the convolution layer.

In operation 920, the neural network apparatus 10 may determine a pruning index indicating weight where pruning is to be performed commonly within the plurality of kernels.

The neural network apparatus 10 may determine the pruning index from among indexes indicating respective locations of weights within a kernel.

According to an embodiment, the neural network apparatus 10 may compute a representative value of weights corresponding to the same index within the plurality of kernels with respect to each index within the kernel. The neural network apparatus 10 may determine the pruning index from among the indexes, based on the representative value computed with respect to each index.

According to some embodiments, the neural network apparatus 10 may obtain a plurality of middle maps by performing an elementwise multiplication operation between each of the plurality of kernels and the input feature map in the Winograd convolution layer. Next, the neural network apparatus 10 may compute a representative value of elements corresponding to the same index of the plurality of middle maps with respect to each index within a middle map. Next, the neural network apparatus 10 may determine the pruning index from among the indexes, based on the representative value computed with respect to each index.

In operation 930, the neural network apparatus 10 may perform a Winograd-based-convolution operation by pruning weight corresponding to the determined pruning index with respect to each of the plurality of kernels.

In addition, the neural network apparatus 10 may group the plurality of kernels in the Winograd convolution layer into a plurality of kernel groups. Next, the neural network apparatus 10 may determine a pruning index which is to be applied to each of the plurality of kernel groups, and may perform a Winograd convolution operation by pruning each of the plurality of kernel groups according to a predetermined pruning index.

According to the present embodiments, a neural network apparatus performs pruning according to a pruning index common with respect to a plurality of kernels and thus may decrease a count of a Winograd-based-convolution operation and increase an operation speed. For example, the neural network apparatus may decrease a count of an elementwise multiplication operation of a Winograd convolution layer and increase an operation speed.

In addition, when performing the Winograd-based-convolution operation, the neural network apparatus may omit some operations related to the pruning index and thus may improve a speed of the Winograd-based-convolution operation.

Figure 10:
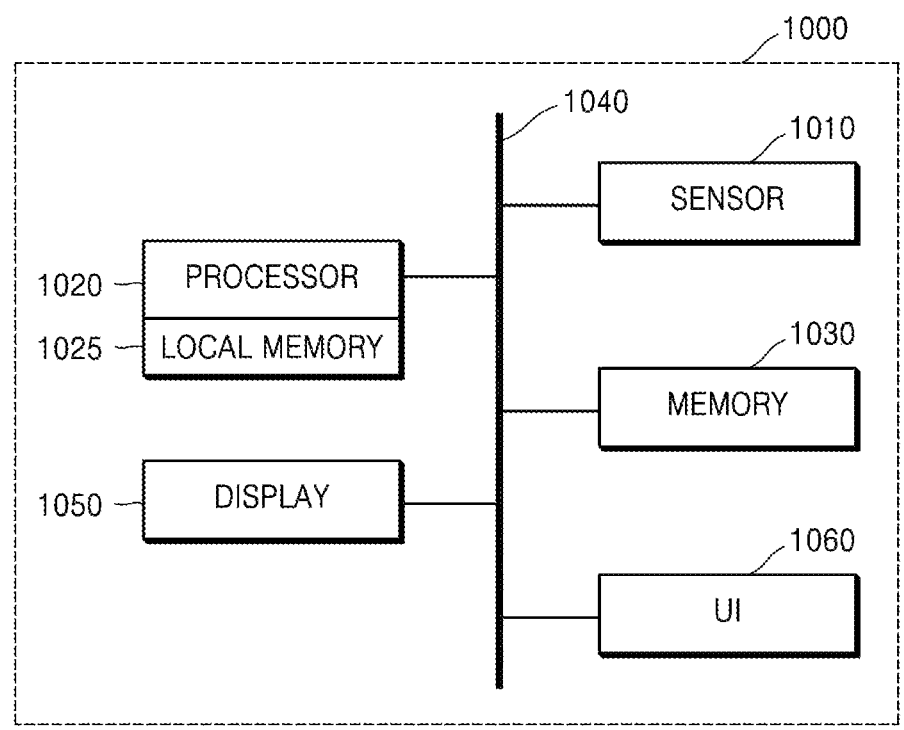
FIG. 10 is a diagram illustrating an example of an electronic system or device configured to implement a neural network inference operation.

FIG. 10 is a diagram illustrating an example of an electronic system or device configured to implement a neural network inference operation.

Referring to FIG. 10, an electronic system or device 1000 includes a sensor 1010, a processor 1020, a local memory 1025, a memory 1030, a display 1050, and a user interface (UI) 1060. The sensor 1010, the processor, 1020, the memory 1030, the display 1050, and the UI 1060 communicate with each other via a bus 1040. The electronic system or device 1000 may correspond to any one or more or all of the above neural network apparatuses and implement any one or more or all of the above neural network processes or methods. As a non-limiting example, the processor 1020 may correspond to processor 910 of FIG. 9, and/or the memory 1030 may correspond to the memory 920 of FIG. 9. The local memory 1025 may also or alternatively correspond to any of the above described temporary or local buffers/memories, while the memory 1030 may store a database from which kernel elements and/or image elements may be loaded from and into the local memory 1025. In an example, the local buffers/memories may be memories of the processor 1020 or buffers/memories directly connected to the processor 1020, e.g., configured for rapidly transferring data to/from the processor 1020 and the local memory 1025, noting that alternatives are also available. The local memory 1025 may further be allocated to temporarily store convolutional output results of a particular layer of the CNN, or all layers of the CNN, the ultimate output results of which may be stored in the memory 1030 and/or respectively used for inputs to a next layer. In an example, except for purposes of an input to a next layer, the convolutional results of each layer may discarded and only final layer(s) output results of the CNN stored to the memory 1030 or used for another process, such as in cooperation with an unlocking and corresponding display operation of a mobile phone as the electronic system or device 1000. As also noted, the processor 1020 may represent one or more processors that are configured as any or any combination of the above neural network apparatuses, recognition apparatuses, rejection apparatuses, and/or verification apparatuses, as non-limiting examples.

The sensor 1010 includes, for example, a microphone to sense audio data and/or an image sensor or camera to sense video data, e.g., to recognize, reject, or verify an object, for example. The sensor 1010 senses an image using a well-known scheme, for example, a scheme of converting an optical image to an electronic signal. An output of the sensor 1010 is transferred to the processor 1020 or the memory 1030, and output of the sensor 1010 may also be transferred directly to, or operate as, an input layer of any of the CNNs discussed herein.

The processor 1020 may be configured to perform one or more or all processes described with reference to FIGS. 1 through 10. For example, to perform a filtering or an object detection, recognition, rejection, and/or verification operations, the processor 1020 may filter, detect, recognize, reject, and/or verify one or more objects in the input data based on the neural network operations described above with respect to FIGS. 1-9, for example. The result of any of the recognition, rejection, or verification operations may be output through the display 1050. In addition, user adjustments or selective operations of the electronic device 1000 be provided by UI 1060, which may include a touch screen or other input device/system. In an example, the processor 1020 may be a graphics processor unit (GPU), a central processing unit (CPU), a reconfigurable processor, an application processor (AP), a neural processing unit (NPU), tensor processing unit (TPU), a HW accelerator, or otherwise an neuromorphic chip, or have any other type of multi- or single-processor configuration. In an example, the processor 1020 is further representative of multiple processors, e.g., with at least one processor being configured as such specialized neural network implementing processors and another processor configured to perform the other operations of the electronic device. Such specialized neural network implementing processors may also be configured in a secure area, with the corresponding processor 1020 and local memory 1025 being securely separated from other operations of other corresponding processors 1020 and the memory 1030, for example.

In addition to operations of one or more of the neural network apparatuses and/or operations described in FIGS. 1-9, as noted above, the memory 1030 may further store instructions which, when executed by processor 1020, cause the processor 1020 to perform additional operations, functions, and controls of the electronic system or device 1000, such as a user interface of the electronic system. The electronic system or device 1000 may be connected to an external device, for example, a personal computer (PC) or a network, via an input/output device of the electronic system, to exchange data with the external device. The electronic system or device 1000 may be various electronic devices, as only non-limiting examples, a mobile device, for example, a mobile telephone, a smartphone, a personal digital assistant (PDA), a tablet computer or a laptop computer, a computing device, for example, a PC, a tablet computer or a netbook computer, an electronic product, for example, a television (TV), a smart TV, or a security device for gate control.

The neural network apparatus 10, the processor 120, and the memory 110, electronic system or device 1000, bus 1040, processor 1020, local memory 1025, sensor 1010, memory 1030, display 1050, and user interface 1060 in FIGS. 1-10 that perform the operations described in this application are implemented by hardware components configured to perform the operations described in this application that are performed by the hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-9 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control computing hardware, for example, one or more processors or computers, to implement the hardware components and perform the methods as described above may be written as computer programs, code segments, instructions or any combination thereof, for individually or collectively instructing or configuring the one or more processors or computers to operate as a machine or special-purpose computer to perform the operations that are performed by the hardware components and the methods as described above. In one example, the instructions or software include machine code that is directly executed by the one or more processors or computers, such as machine code produced by a compiler. In another example, the instructions or software includes higher-level code that is executed by the one or more processors or computer using an interpreter. The instructions or software may be written using any programming language based on the block diagrams and the flow charts illustrated in the drawings and the corresponding descriptions in the specification, which disclose algorithms for performing the operations that are performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access memory (RAM), flash memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, magnetic tapes, floppy disks, magneto-optical data storage devices, optical data storage devices, hard disks, solid-state disks, and any other device that is configured to store the instructions or software and any associated data, data files, and data structures in a non-transitory manner and provide the instructions or software and any associated data, data files, and data structures to one or more processors or computers so that the one or more processors or computers can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The particular implementations shown and described herein are illustrative examples of embodiments and are not intended to otherwise limit the scope of embodiments in any way. For the sake of brevity, electronics, control systems, software development and other functional aspects of the systems may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical apparatus.

The use of the terms "a", "an", and "the" and similar referents in the context of describing embodiments (especially in the context of the following claims) are to be construed to cover both the singular and the plural. Furthermore, recitation of ranges of values herein are merely intended to serve as a shorthand method of referring individually to each separate value falling within the range, unless otherwise indicated herein, and each separate value is incorporated into the specification as if it were individually recited herein. Also, the operations of all methods described herein may be performed in any suitable order unless otherwise indicated herein or otherwise clearly contradicted by context. Embodiments are not limited to the described order of the operations. The use of any and all examples, or exemplary language (e.g., "such as") provided herein, is intended merely to better illuminate embodiments and does not pose a limitation on the scope of embodiments unless otherwise claimed. Numerous modifications and adaptations will be readily apparent after an understanding of the disclosure of this application without departing from the spirit and scope of the inventive concept.

It should be understood that embodiments described herein should be considered in a descriptive sense only and not for purposes of limitation. Descriptions of features or aspects within each embodiment should typically be considered as available for other similar features or aspects in other embodiments.

While one or more embodiments have been described with reference to the figures, it will be understood after an understanding of the disclosure of this application that various changes in form and details may be made therein without departing from the spirit and scope as defined by the following claims.

What is claimed is:

1. A processor-implemented neural network method, the method comprising:
    selecting a pruning index indicating a weight location where pruning is to be performed commonly within a plurality of kernels of a neural network; and
    generating, for an input feature map, a plurality of output feature maps by performing a Winograd-based convolution operation by pruning a weight corresponding to the selected pruning index with respect to each of the plurality of kernels to decrease an operation count of the Winograd-based convolution operation and training the neural network without the pruned weight to compensate for accuracy of the Winograd-based convolution operation.

2. The method of claim 1, further comprising:
    obtaining another of a plurality of kernels and another input feature map; and
    generating the plurality of kernels and the input feature map by performing a Winograd Transform on the other plurality of kernels and the other input feature map.

3. The method of claim 1, wherein the selecting comprises selecting the pruning index from among plural indices indicating respective locations of weights within a kernel.

4. The method of claim 1, wherein the selecting comprises:
    generating a representative value of weights corresponding to a same index within the plurality of kernels, with respect to each of plural indices within a kernel; and
    selecting the pruning index, from among the plural indices, based on the representative value generated with respect to each of the plural indices.

5. The method of claim 4, wherein the representative value is any one of a root-mean square of the weights, an average value of the weights, and a median value of weights.

6. The method of claim 4, wherein the selecting of the pruning index from among the plural indices comprises selecting, as the pruning index, at least one index, from among the plural indices, having a representative value less than a predetermined threshold.

7. The method of claim 1, wherein the selecting comprises:
    generating a plurality of middle maps by performing an elementwise multiplication operation between each of the plurality of kernels and the input feature map;
    generating a representative value of elements corresponding to a same index within the plurality of middle maps, with respect to each of plural indices within a middle map; and
    selecting the pruning index, from among the plural indices, based on the representative value generated with respect to each of the plural indices.

8. The method of claim 1, wherein
    the selecting comprises grouping the plurality of kernels into a plurality of kernel groups and determining a pruning index for each of the plurality of kernels groups which is to be applied to each respective kernel group, and
    the generating of the plurality of output feature maps comprises performing the Winograd-based convolution operation by pruning each of the plurality of kernel groups according to the determined pruning indices.

9. The method of claim 1, further comprising:
    adjusting weights with respect to each of the plurality of kernels based on a result of the Winograd-based convolution operation, for generating a trained kernel.

10. The method of claim 9, further comprising:
    obtaining the trained kernel;
    performing another convolution operation with another input feature map using the trained kernel in an inference operation; and
    indicating a result of the inference operation.

11. A non-transitory computer-readable storage medium storing instructions that, when executed by a processor, cause the processor to perform the method of claim 1.

12. The method of claim 1, further comprising executing instructions by a processor, configuring the processor to perform the selecting and the generating.

13. A neural network apparatus comprising: a processor configured to:
    select a pruning index indicating a weight location where pruning is to be performed commonly within a plurality of kernels of a neural network; and
    generate, for an input feature map, a plurality of output feature maps by performing a Winograd-based convolution operation by pruning a weight corresponding to the determined pruning index with respect to each of the plurality of kernels to decrease an operation count of the Winograd-based convolution operation and training the neural network without the pruned weight to compensate for accuracy of the Winograd-based convolution operation.

14. The neural network apparatus of claim 13, wherein, for the selecting, the processor is further configured to select the pruning index from among plural indices indicating respective locations of weights within a kernel.

15. The neural network apparatus of claim 13, wherein, for the selecting, the processor is further configured to:
generate a representative value of weights corresponding to a same index within the plurality of kernels, with respect to each of plural indices within a kernel; and
select the pruning index, from among the plural indices, based on the representative value generated with respect to each of the plural indices.

16. The neural network apparatus of claim 15, wherein the representative value is any one of a root-mean square of the weights, an average value of the weights, and a median value of weights.

17. The neural network apparatus of claim 15, wherein, for the selecting, the processor is further configured to select, as the pruning index, at least one index, from among the plural indices, having a representative value less than a predetermined threshold.

18. The neural network apparatus of claim 13, wherein, for the selecting, the processor is further configured to:
generate a plurality of middle maps by performing an elementwise multiplication operation between each of the plurality of kernels and the input feature map;
generate a representative value of elements corresponding to a same index within the plurality of middle maps, with respect to each of plural indices within a middle map; and
select the pruning index from among the plural indices, based on the representative value generated with respect to each of the plural indices.

19. The neural network apparatus of claim 13,
wherein, for the selecting, the processor is further configured to:
group the plurality of kernels into a plurality of kernel groups; and
select a pruning index for each of the plurality of kernels groups which is to be applied to each respective kernel group, and
wherein, for the generating of the plurality of output feature maps, the processor is further configured to perform the Winograd-based convolution operation by pruning each of the plurality of kernel groups according to the determined pruning indices.

20. The neural network apparatus of claim 13, wherein the processor is further configured to:
obtain another plurality of kernels and another input feature map; and
generate the plurality of kernels and the input feature map by performing a Winograd Transform on the other plurality of kernels and the other input feature map.

21. A processor-implemented neural network method, the method comprising:
selecting a pruning index with respect to a plurality of kernels of a neural network in a Winograd domain;
generating a plurality of pruned kernels by pruning, for each of the plurality of kernels, a weight corresponding to the selected pruning index to decrease an operation count of a convolution operation; and
generating a plurality of output feature maps by performing the convolution operation with respect to an input feature map and each of the plurality of pruned kernels and training the neural network without the pruned kernel to compensate for accuracy of the Winograd based convolution operation.

22. The method of claim 21, further comprising:
generating representative weights, wherein each representative weight is based on weights of the plurality of kernels corresponding to a same index; and
selecting a representative weight from the representative weights,
wherein the selecting of the pruning index includes selecting the pruning index corresponding to the selected representative weight.

23. The method of claim 21, further comprising:
generating a plurality of middle maps by performing an operation between each of the plurality of kernels and the input feature map;
generating representative weights, wherein each representative weight is based on weights of the plurality of middle maps corresponding to a same index; and
selecting a representative weight from the representative weights,
wherein the selecting of the pruning index includes selecting the pruning index corresponding to the selected representative weight, and
wherein the generating of the plurality of output feature maps comprises performing the convolution operation with respect to each of the plurality of middle maps and a predetermined matrix.

24. A processor-implemented neural network method, the method comprising:
grouping a plurality of kernels of a neural network in a Winograd domain into a plurality of kernel groups;
selecting a pruning index for each of the plurality of kernel groups;
pruning, for each of the plurality of kernel groups, kernel weights corresponding to the selected pruning index to decrease an operation count of a convolution operation; and
generating a plurality of output feature maps by performing the convolution operation with respect to an input feature map and each of the plurality of kernels and training the neural network without the pruned weight to compensate for accuracy of the Winograd-based convolution operation.

* * * * *